US 6,726,392 B2

(12) United States Patent
El-Haw et al.

(10) Patent No.: US 6,726,392 B2
(45) Date of Patent: Apr. 27, 2004

(54) BALL JOINT WITH DUAL STUDS

(75) Inventors: Adham El-Haw, St. Catharines (CA); John Thompson, Fonthill (CA); Rob Schmidt, St. Catharines (CA); Gord Rowe, Welland (CA)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/973,220

(22) Filed: Oct. 9, 2001

(65) Prior Publication Data

US 2003/0068193 A1 Apr. 10, 2003

(51) Int. Cl.$^7$ ................................................. B62D 7/16
(52) U.S. Cl. .......................... 403/56; 403/122; 403/128
(58) Field of Search .......................... 403/56, 122, 124, 403/128, 135, 125

(56) References Cited

U.S. PATENT DOCUMENTS

| | | | | |
|---|---|---|---|---|
| 2,456,182 A | * | 12/1948 | Goble | 403/56 X |
| 4,438,612 A | * | 3/1984 | Bernard et al. | 403/56 X |
| 4,473,240 A | * | 9/1984 | Sanada | 403/56 X |
| 4,557,623 A | * | 12/1985 | Tella | 403/56 X |

* cited by examiner

Primary Examiner—John R. Cottingham
(74) Attorney, Agent, or Firm—Tarolli, Sundheim, Covell & Tummino L.LP.

(57) ABSTRACT

A ball joint (10) connects a first vehicle part (12) to a second vehicle part (14) and enables relative movement between the first and second vehicle parts. The ball joint (10) includes a housing (30) that defines a chamber (40). A first stud (80) has a first portion (84) fixedly connected to the first vehicle part (12) and an opposite second portion (82) received in the chamber (40). A second stud (120) has a first portion (124) fixedly connected to the second vehicle part (14) and a second portion (122) received in the chamber (40). A spherical member (160) is disposed in the chamber (40) between the second portions (82 and 122) of the first and second studs (80 and 120) in mating and abutting engagement with the second portions of the studs. The first and second studs (80 and 120) each are movable independently in pivotal and rotational directions relative to the housing (30).

19 Claims, 4 Drawing Sheets

BALL JOINT WITH DUAL STUDS

TECHNICAL FIELD

The present invention relates to a ball joint. In particular, the present invention relates to a ball joint with dual studs.

BACKGROUND OF THE INVENTION

It is known to interconnect vehicle parts using a ball joint in order to provide relative movement between the vehicle parts. A typical ball joint includes a socket and a ball stud. The ball stud has a ball portion received in the socket and a shank portion projecting from the socket. The socket supports the ball stud for pivotal and/or rotational movement relative to the socket. The socket includes a bearing upon which the ball portion of the ball stud pivots and/or rotates.

SUMMARY OF THE INVENTION

A ball joint connects a first vehicle part to a second vehicle part and enables relative movement between the first and second vehicle parts. The ball joint includes a housing that defines a chamber. A first stud has a first portion fixedly connected to the first vehicle part and an opposite second portion received in the chamber. A second stud has a first portion fixedly connected to the second vehicle part and a second portion received in the chamber. A spherical member is disposed in the chamber between the second portions of the first and second studs in mating and abutting engagement with the second portions of the studs. The first and second studs each are movable independently in pivotal and rotational directions relative to the housing.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
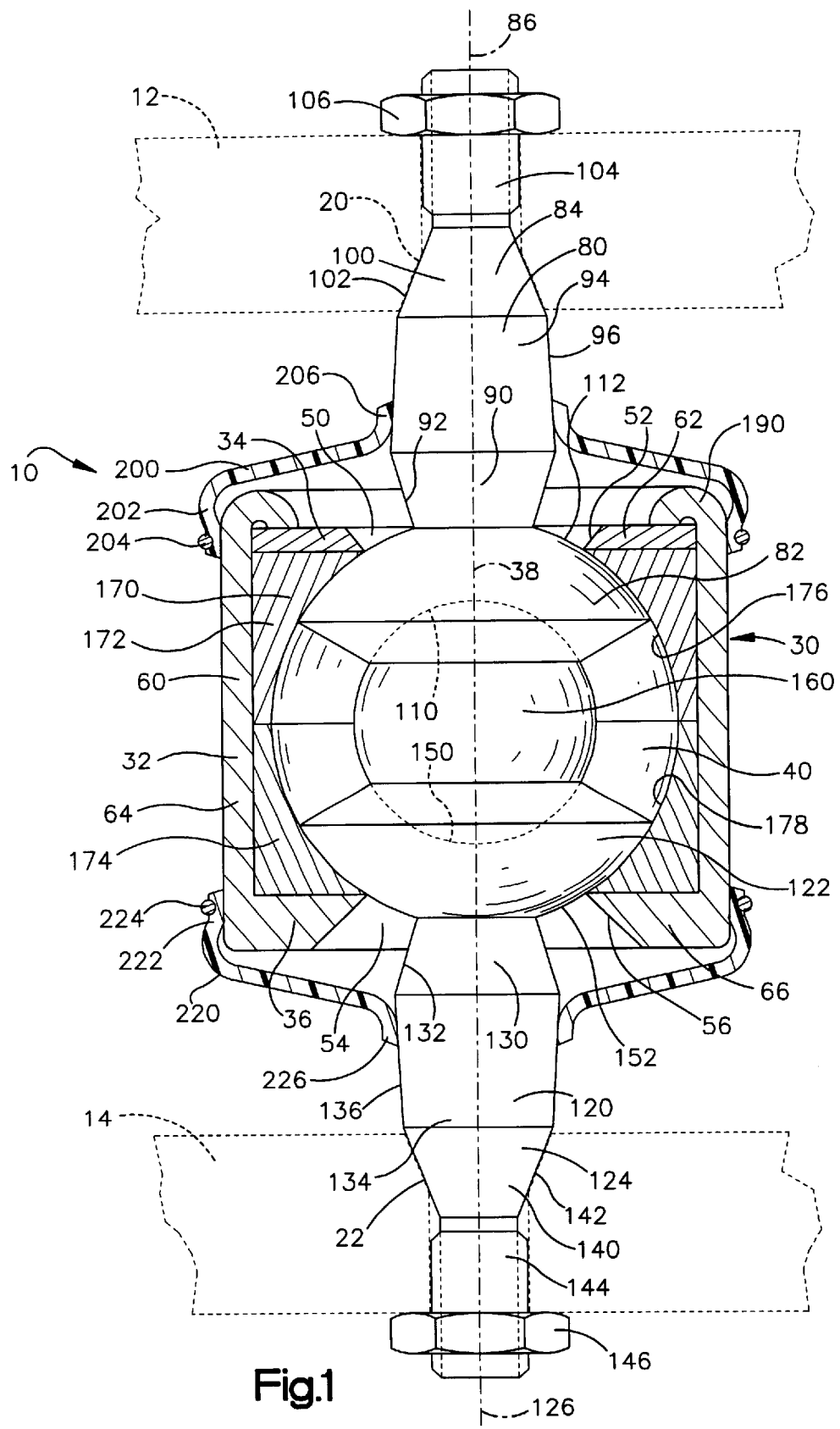
FIG. 1 is a schematic view, partially in section, of a ball joint constructed in accordance with a first embodiment of the present invention.

The present invention relates to a ball joint for connecting vehicle parts for movement relative to each other. As representative of the invention, FIG. 1 illustrates a ball joint 10. The ball joint 10 is located between a first vehicle part shown partially at 12 and a second vehicle part shown partially at 14.

The first vehicle part 12 may be a steering knuckle or steering yoke, for example. The second vehicle part 14 may be a control arm or steering yoke or steering knuckle, for example. In the embodiment illustrated in FIG. 1, the first and second vehicle parts 12 and 14 have respective frusto-conical surfaces that define a tapered bores or openings, indicated at 20 and 22, for receiving the ball joint 10. Those skilled in the art, however, will recognize that the first and second vehicle parts 12 and 14 may include alternative means for receiving the ball joint 10.

Figure 2:
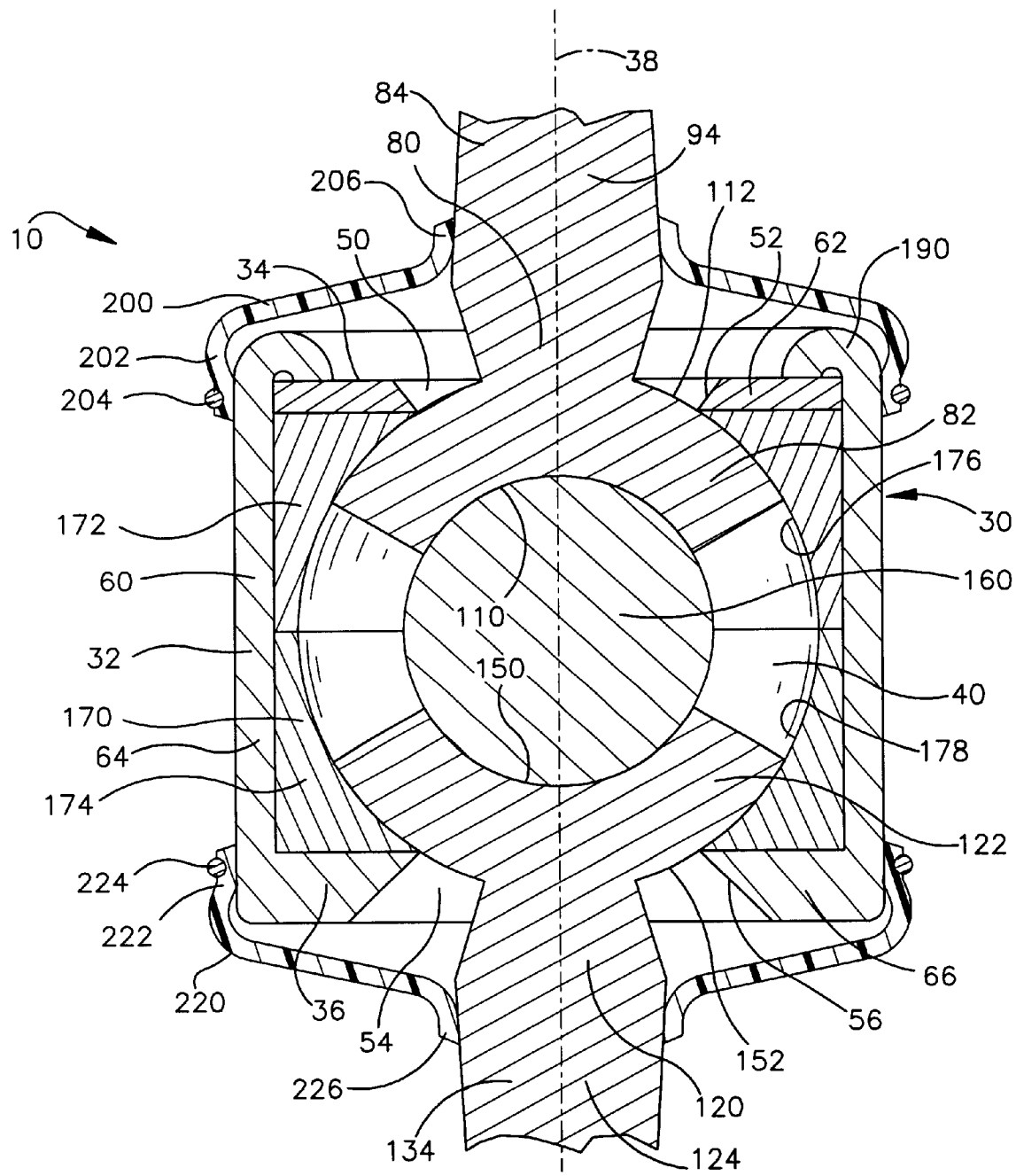
FIG. 2 is an enlarged sectional view of a portion of the ball joint of FIG. 1.

Referring to FIGS. 1 and 2, the ball joint 10 includes a housing 30 that preferably has a generally cylindrical configuration with a central axis 38. The housing 30 has a cylindrical side wall 32 that extends between first and second opposite end walls 34 and 36 of the housing. The side wall 32 and first and second end walls 34 and 36 define a chamber 40 of the housing 30.

The first end wall 34 has a circular first opening 50 that extends through the first end wall. The first opening 50 may have a beveled or angled edge portion 52. The second end wall 36 has a generally circular second opening 54 that extends through the second end wall. The second opening 54 may have a beveled or angled edge portion 56.

In the embodiment illustrated in FIGS. 1 and 2, the housing 30 includes a canister 60 and a plug 62 connected to the canister. The canister 60 has a cylindrically extending side wall 64 which forms the side wall 32 of the housing 30. An end wall 66 of the canister 60 forms the second end wall 36 of the housing 30. The plug 62 forms the first end wall 34 of the housing 30. Those skilled in the art, however, will recognize that the ball joint 10 may have alternative constructions.

The ball joint 10 also includes a first stud 80 that has a socket portion 82 disposed in the chamber 40 and a shank portion 84 that projects from the socket portion 82 and extends through the first opening 50 in the first end wall 34. The socket portion 82 has a concave semispherical or dome-shaped surface 110 facing generally towards the second end 36 of the housing 30.

The shank portion 84 (FIG. 1) includes a first section 90 centered on a longitudinal axis 86 of the first stud 80. The first section 90 has a frustoconical or tapered outer surface 92 that extends outward from the socket portion 82 of the first stud 80. The shank portion 84 also includes a second section 94, centered on the longitudinal axis 86, that has a tapered outer surface 96. The shank portion 84 also includes a third section 100 centered on the longitudinal axis 86. The third section 100 has a tapered outer surface 102 that extends inward from the second section 94 of the first stud 80. The shank portion 84 further includes a threaded end section 104.

When the ball joint 10 is connected to the first vehicle portion 12, the third section 100 of the shank portion 84 is fitted in the tapered opening 20 in the first vehicle portion in a tight, force-fitting connection. A fastener 106, such as a nut, is screwed on the threaded end section 104 of the shank portion 84 to secure the connection.

The ball joint 10 (FIGS. 1 and 2) also includes a second stud 120 that has a socket portion 122 disposed in the chamber 40 and a shank portion 124 that projects from the socket portion and extends through the second opening 54 in the second end wall 36. As illustrated in FIGS. 1 and 2, the second stud 120 may have a construction that is substantially identical to the first stud 80. The first and second studs 80 and 120 may thus be interchangeable. The socket portion 122 has a concave semispherical or dome-shaped surface 150 facing generally towards the first end 34 of the housing 30.

The shank portion 124 (FIG. 1) includes a first section 130 centered on a longitudinal axis 126 of the second stud 120. The first section 130 has a frustoconical or tapered outer surface 132 that extends outward from the socket portion 122 of the second stud 120. The shank portion 124 also includes a second section 134 centered on the longitudinal axis 126 and having a cylindrical outer surface 136. The shank portion 124 also includes a third section 140 centered on the longitudinal axis 126. The third section 140 has a tapered outer surface 142 that extends inward from the second section 134 of the second stud 120. The shank portion 124 further includes a threaded end section 144.

When the ball joint 10 is assembled with the second vehicle portion 14, the third section 140 of the shank portion 124 is fitted in the tapered opening 22 in the second vehicle portion in a tight, force-fitting connection. A fastener 146, such as a nut, is screwed on the threaded end section 144 of the shank portion 124 to secure the connection.

The ball joint 10 (FIGS. 1 and 2) further includes a spherical member 160, such as a ball bearing, that is disposed in the chamber 40. The spherical member 160 is positioned between the first and second studs 80 and 120 and is received in the socket portions 82 and 122 of the first and second studs. The spherical member 100 is positioned in mating and abutting engagement with the inner surfaces 110 and 150 of the socket portions 82 and 122, respectively. The inner surfaces 110 and 150 are slidable or moveable over the spherical member 160.

The ball joint 10 may include a lubricant (not shown), such as grease, which helps to lubricate the ball joint components. Therefore, those skilled in the art will appreciate that when the components of the ball joint 10 are described herein as being in mating and abutting engagement with each other, it is meant that the components are adjacent and touching or that a layer of lubricant is disposed between the components.

The ball joint 10 also includes a bearing 170 that is located in the chamber 40. The bearing 170 may have a two-piece construction in which the bearing includes first and second separate portions 172 and 174. An outer surface 112 of the socket portion 82 of the first stud 80 is positioned in mating and abutting engagement with an inner surface 176 of the first portion 172 of the bearing 170. An outer surface 152 of the socket portion 122 of the second stud 120 is positioned in mating and abutting engagement with an inner surface 178 of the second portion 174 of the bearing 170. The outer surfaces 112 and 152 are slidable or moveable over the bearing 170. A layer of lubricant (not shown) may be disposed between the outer surfaces 112 and 152 and the inner surfaces 176 and 178, respectively.

The canister 60 includes an annular flange 190 that is rolled over to connect the plug 62 to the canister. The flange 190 presses the plug 62 against the bearing 170 and retains the first and second studs 80 and 120, the spherical member 160, and the bearing 170 in the chamber 40. The flange 190 may also apply a compressive force to the first and second studs 80 and 120, the spherical member 160, and the bearing 170.

A first seal 200 extends between the housing 30 and the shank portion 84 of the first stud 80. The first seal 200 helps prevent lubricant from coming out of the housing 30 and also helps prevent dirt and other items from entering into the housing. The first seal 200 has a first end portion 202 connected with the housing 30 by means 204 such as a ring spring or other suitable device. The first seal 200 has a second end portion 206 connected with the second section 94 of the shank portion 84. The second portion 206 may be connected to the second section 94 via an elastic property of the material used to construct the first seal 200. Alternatively, means (not shown) such as a ring spring or other suitable device could be used to connect the second portion 206 to the second section 94.

A second seal 220 extends between the housing 30 and the shank portion 124 of the second stud 120. The second seal 220 helps prevent lubricant from coming out of the housing 30 and also helps prevent dirt and other items from entering into the housing. The second seal 200 has a first end portion 222 connected with the housing 30 by means 224 such as a ring spring or other suitable device. The second seal 220 has a second end portion 226 connected with the second section 134 of the shank portion 124. The second portion 226 may be connected to the second section 134 via an elastic property of the material used to construct the second seal 220. Alternatively, means (not shown) such as a ring spring or other suitable device could be used to connect the second portion 226 to the second section 134.

Figure 3:
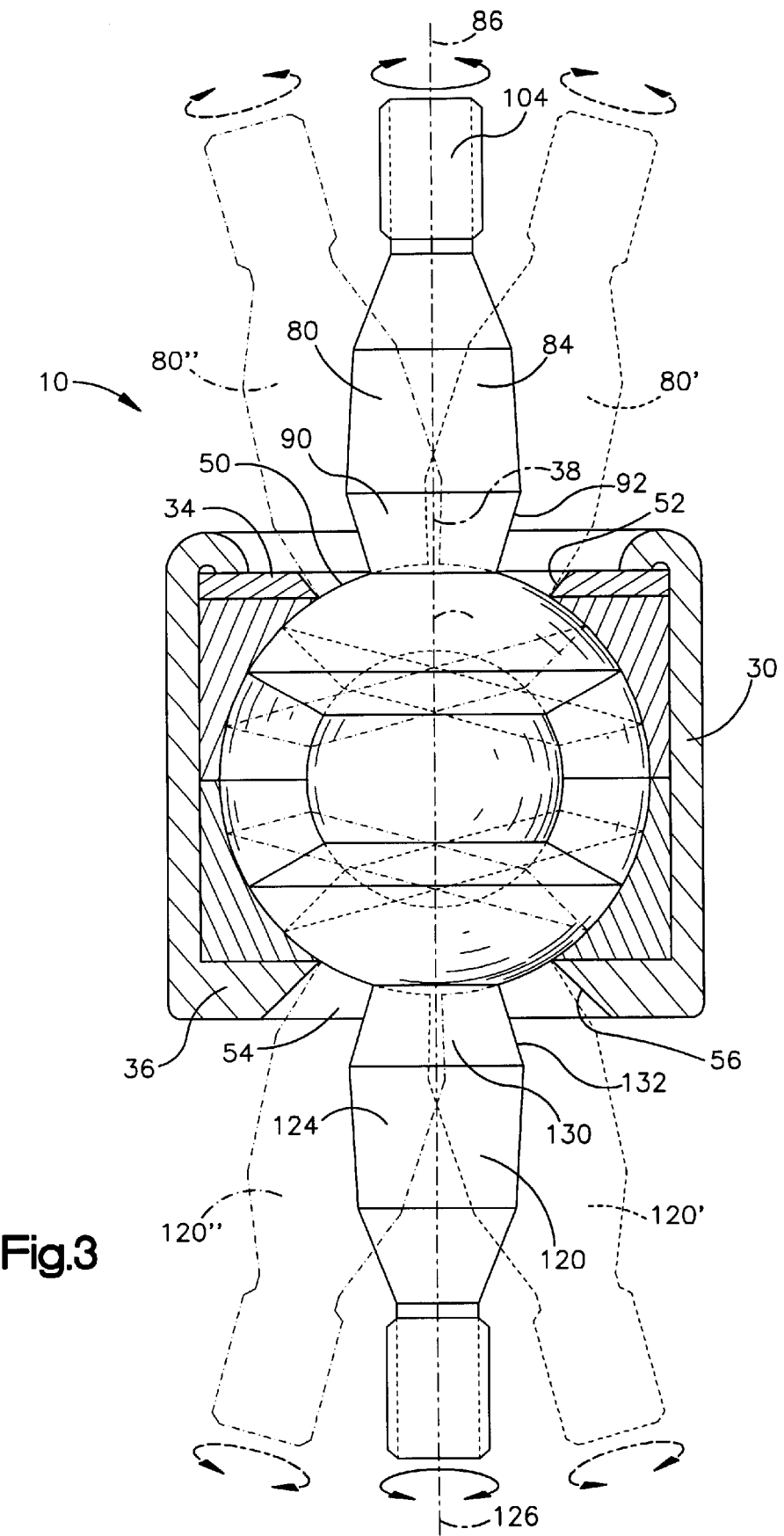
FIG. 3 is a view similar to FIG. 1 illustrating the ball joint with parts in different positions.

In accordance with the first embodiment of the present invention, the first stud 80 and the second stud 120 are independently moveable in pivotal and/or rotational directions relative to each other, relative to the spherical member 160, and relative to the housing 30. As illustrated in FIG. 3, the ball joint 10 has an aligned position wherein the central axis 38 of the housing 30 and the longitudinal axes 86 and 126 of the first and second studs 80 and 120 extend along the same line. The first and second studs 80 and 120 are independently pivotal relative to the housing 30 and to each other to any position between a first extreme position, illustrated in dashed lines at 80' and 120', and a second extreme position, illustrated in dashed lines at 80" and 120".

The first and second studs 80 and 120 are also independently rotational about their respective longitudinal axes 86 and 126, as indicated by the arrows of FIG. 3. The first and second studs 80 and 120 are capable of such rotation regardless of the pivotal position of the studs.

Pivotal movement of the first stud 80 is limited by the first opening 50 in the first end 34 of the housing 30. The tapered outer edge 92 of the first section 90 of the shank portion 84 engages the beveled edge portion 52 of the first opening 50 to limit pivotal movement of the first stud 80. Pivotal movement of the second stud 120 is limited by the second opening 54 in the second end 36 of the housing 30. The tapered outer edge 132 of the first section 130 of the shank portion 124 engages the beveled edge portion 56 of the second opening 54 to limit pivotal movement of the first stud 80.

Figure 4:
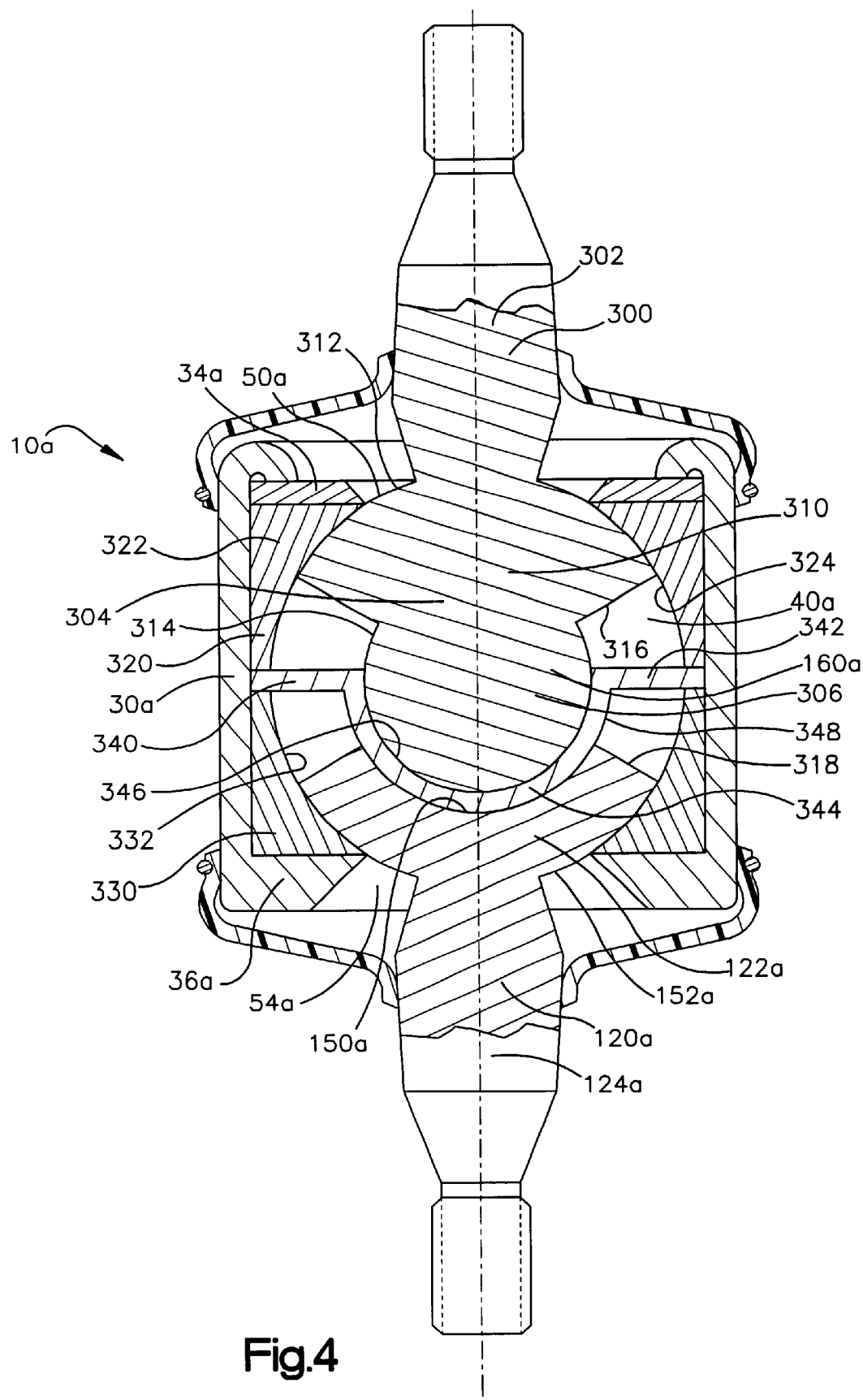
FIG. 4 is a schematic view, partially in section, of a ball joint constructed in accordance with a second embodiment of the present invention.

A second embodiment of the present invention is illustrated in FIG. 4. The second embodiment of the invention is similar to the first embodiment of the invention illustrated in FIGS. 1–3. Accordingly, numerals similar to those of FIGS.

1–3 will be utilized in FIG. 4 to identify similar components, the suffix letter "a" being associated with the numerals of FIG. 4 to avoid confusion. The ball joint 10a (FIG. 4) of the second embodiment is similar to the ball joint 10 (FIGS. 1–3), except that the spherical member, first stud, and bearing of the second embodiment have a different configuration than the spherical member, first stud, and bearing of the first embodiment (FIGS. 1–3).

As illustrated in FIG. 4, the ball joint 108a includes a first stud 300 and a second stud 120a. In the second embodiment, the first stud 300 and the spherical member 160a are constructed of a single piece of material. The first stud 300 includes a shank portion 302 extending through the first opening 50a in the first end 34a of the housing 30a and a ball portion 304 disposed in the chamber 40a. The ball portion 304 includes a semispherical end portion 306 which is formed by the spherical member 106a. The end portion 306 is positioned centrally in the housing 30a. The ball portion 304 also includes a body portion 310 positioned between the end portion 306 and the shank portion 302.

The second stud 120a has a shank portion 124a extending through the second opening 54a in the second end 36a of the housing 30a and socket portion 122a disposed in the chamber 40a. The second stud 120a may be substantially similar or identical to the second stud of the first embodiment (FIGS. 1–3).

The ball joint 10a further includes a bearing 320 disposed in the chamber 40a. The bearing 320 includes an upper bearing portion 322, a lower bearing portion 330, and a central bearing portion 340. The upper bearing portion 322 is positioned adjacent the first end wall 34a and has a generally concave semispherical inner surface 324 facing inward from the first end wall toward the second end wall 36a. The lower bearing portion 330 is positioned adjacent the second end wall 36a and has a generally concave semispherical inner surface 332 facing inward from the second end wall toward the first end wall 34a. The central bearing portion 340 is positioned between the upper and lower bearing portions and includes a radially extending flange portion 342 and a semispherical or dome-shaped socket portion 344. The socket portion 344 has a concave semispherical inner surface 346 facing towards the first end wall 34a and an opposite convex semispherical outer surface 348 facing the second end wall 36a.

The body portion 310 of the ball portion 304 has an outer surface 312 positioned in mating and abutting engagement with the inner surface 324 of the upper bearing portion 322. The ball end 306 of the ball portion 304 has an outer surface 314 in mating and abutting engagement with the inner surface 346 of the socket portion 344 of the central bearing portion 340.

The socket portion 122a has an outer surface 152a in mating and abutting engagement with the inner surface 332 of the lower bearing portion 330. The socket portion 122a has an inner surface 150a positioned in mating and abutting engagement with the outer surface 348 of the socket portion 344 of the central bearing portion 340.

In accordance with the second embodiment of the present invention, the first stud 300 and the second stud 120a are independently moveable in pivotal and/or rotational directions relative to each other and relative to the housing 30a. Pivotal movement of the first stud 300 is limited by the first opening 50a. Pivotal movement of the second stud 120a is limited by the second opening 54a. Pivotal movement of the first stud 300 may also be limited when an end surface 316 of the body portion 304 engages the flange portion 342 of the central bearing portion 340. Pivotal movement of the second stud 120a may also be limited when an end surface 318 of the socket portion 122a engages the flange portion 342 of the central bearing portion 340.

From the above description of the invention, those skilled in the art will perceive improvements, changes and modifications in the invention. For example, in the second embodiment, the central bearing portion 140 could be omitted, in which case the ball portion 304 of the first stud 300 would be positioned in mating and abutting engagement with, and slidable or moveable over, the socket portion 122a of the second stud 120a. Such improvements, changes and modifications within the skill of the art are intended to be covered by the appended claims.

Having described the invention, the following is claimed:

1. A ball joint comprising:

a housing having a first end wall with a first opening extending therethrough, an opposite second end wall with a second opening extending therethrough, and a side wall extending between said first and second end walls, a chamber being defined within said side wall between said first and second end walls;

a first stud having a socket portion received in said chamber and a shank portion extending through said first opening, said socket portion including a concave semispherical surface facing generally toward said second end wall;

a second stud having a socket portion received in said chamber and a shank portion extending through said second opening, said socket portion of said second stud including a concave semispherical surface facing generally toward said first end wall; and a spherical member disposed in said chamber between said socket portions of said first and second studs and positioned in mating and abutting engagement with said semispherical surfaces of said socket portions of said first and second studs, said first and second studs each being movable pivotally and rotationally relative to said spherical member.

2. A ball joint for connecting first and second vehicle parts and enabling relative movement between the first and second vehicle parts, said ball joint comprising:

a housing defining a chamber, said housing having a first end wall with a first opening extending therethrough to communicate with said chamber and an opposite second end wall with a second opening extending therethrough to communicate with said chambers;

a first stud having a first portion for fixed connection to the first vehicle part and an opposite second portion received in said first opening, said second portion of said first stud having a first outer conical surface that tapers radially outward as said first outer conical surface extends axially toward said first portion of said first stud;

a second stud having a first portion for fixed connection to the second vehicle part and a second portion received in said second opening, said second portion of said second stud having a second outer conical surface that tapers radially outward as said second outer conical surface extends axially toward said first portion of said second stud; and a spherical member disposed in said chamber between said second portions of said first and second studs, said spherical member being associated with said second portions of said first and second studs such that said first and second studs each move independently relative to each other in pivotal and rotational directions and relative to said housing, said first opening of said first end wall of said housing defining a first annular surface that tapers radially outward as said first annular surface extends axially away from said spherical member, said second opening of said second end wall of said housing defining a second annular surface that tapers radially outward as said second annular surface extends axially away from said spherical member, said first opening of said housing limiting pivotal movement of said first stud relative to said housing when said first conical surface of said first stud engages said first annular surface of said housing, said second opening of said housing limiting pivotal movement of said second stud relative to said housing when said second conical surface of said second stud engages said second annular surface of said housing.

3. The ball joint as recited in claim 2 wherein said chamber has a generally cylindrical configuration.

4. The ball joint as recited in claim 2 wherein said housing has a first end wall with a first opening extending therethrough, an opposite second end wall with a second opening extending therethrough, and a side wall extending between said first and second end walls, said chamber being defined within said side wall between said first and second end walls; and said first portion of said second stud comprising a shank portion extending through said second opening, and said second portion of said second stud comprising a socket portion received in said chamber.

5. The ball joint as recited in claim 4 wherein said housing comprises a canister portion and a plug portion, said canister portion forming said side wall and said second end wall, said plug portion forming said first end wall, said plug portion being connected to said canister portion to retain said first stud, said second stud, and said spherical member within said chamber.

6. The ball joint as recited in claim 4 wherein said housing has a central axis extending through said first and second openings, said first and second studs each having a longitudinal axis, said ball joint having an aligned position wherein said central axis and said longitudinal axes extend along a single line.

7. The ball joint as recited in claim 2 wherein said second stud is movable pivotally and rotationally relative to said spherical member.

8. A ball joint for connecting first and second vehicle parts and enabling relative movement between the first and second vehicle parts, said ball joint comprising:

a housing defining a chamber;

a first stud having a first portion for fixed connection to the first vehicle part and an opposite second portion received in said chamber;

a second stud having a first portion for fixed connection to the second vehicle part and a second portion received in said chamber; and a spherical member disposed in said chamber between said second portions of said first and second studs, said spherical member being associated with said second portions of said first and second studs, said first and second studs having a substantially identical construction and being interchangeable with each other.

9. The ball joint as recited in claim 2 wherein said housing has a first end wall with a first opening extending therethrough, an opposite second end wall with a second opening extending therethrough, and a side wall extending between said first and second end walls, a chamber being defined within said side wall between said first and second end walls;

said first portion of said first stud comprising a shank portion extending through said first opening, and said second portion of said first stud comprising a socket portion received in said chamber;

said first portion of said second stud comprising a shank portion extending through said second opening, and said second portion of said second stud comprising a socket portion received in said chamber.

10. A ball joint for connecting first and second vehicle parts and enabling relative movement between the first and second vehicle parts, said ball joint comprising:

a housing defining a chamber;

a first stud having a first portion for fixed connection to the first vehicle part and an opposite second portion received in said chamber;

a second stud having a first portion for fixed connection to the second vehicle part and a second portion received in said chamber; and a spherical member disposed in said chamber between said second portions of said first and second studs, said spherical member being associated with said second portions of said first and second studs, said second portion of said first stud comprising a concave semispherical surface for receiving a first portion of said spherical member, and said second portion of said second stud comprising a concave semispherical surface for receiving a second portion of said spherical member positioned generally opposite said first portion of said spherical member.

11. The ball joint as recited in claim 9 further comprising at least one bearing disposed in said chamber, said socket portions of said first and second studs each comprising an outer surface in mating and abutting engagement with said at least one bearing, said outer surfaces being movable over said at least one bearing.

12. The ball joint as recited in claim 9 wherein said spherical member is constructed of a material which exhibits low friction with said socket portions of said first and second studs.

13. The ball joint as recited in claim 2 wherein said spherical member comprises a ball bearing.

14. The ball joint as recited in claim 2 wherein said first stud and said spherical member are constructed as a single piece of material and not separate parts connected together, said spherical member comprising a convex, semispherical end portion of said first stud; and said second portion of said second stud comprising a semispherical socket portion of said second stud, said end portion of said first stud being associated with said socket portion of said second stud in said chamber such that said first and second studs are movable pivotally and rotationally relative to each other.

15. The ball joint as recited in claim 14 wherein said housing has a first end wall with a first opening extending therethrough, an opposite second end wall with a second opening extending therethrough, and a side wall extending between said first and second end walls, said chamber being defined within said side wall between said first and second end walls, said first portion of said first stud comprising a shank portion extending through said first opening, said first portion of said second stud comprising a shank portion extending through said second opening.

16. The ball joint as recited in claim 14 further comprising at least one bearing including a semispherical central portion disposed in said chamber associated with said second portions of said first and second studs, said end portion of said first stud and said socket portion of said second stud being in mating and abutting engagement with said semispherical central portion, said end portion of said first stud and said socket portion of said second stud being movable over said central portion of said at least one bearing.

17. The ball joint as recited in claim 16 wherein said semispherical central portion of said at least one bearing includes a socket portion positioned between said first and second studs, said socket portion of said central portion having a concave semispherical first surface in mating and abutting engagement with said end portion of said first stud, said socket portion of said central portion having a convex semispherical second surface opposite said first surface, said second surface being in mating and abutting engagement with said socket portion of said second stud.

18. The ball joint as recited in claim 15 wherein said housing has a central axis extending through said first and second openings, said first and second studs each having a longitudinal axis extending through said first and second studs, said ball joint having an aligned position wherein said central axis and said longitudinal axes extend along a single line.

19. The ball joint as recited in claim 15 wherein said housing comprises a canister portion and a plug portion, said canister portion forming said side wall and said second end wall, said plug portion forming said first end wall, said plug portion being connected to said canister portion to retain said first stud and said second stud within said chamber.

* * * * *